(12) United States Patent
Nikolov et al.

(10) Patent No.: US 12,450,373 B2
(45) Date of Patent: Oct. 21, 2025

(54) DOCUMENT PROTECTION MECHANISM

(71) Applicant: Nuvolo Technologies Corporation, Paramus, NJ (US)

(72) Inventors: Kristiyan Nikolov, Sofia (BG); Atanas Dimitrov, Sofia (BG); Vladimir Paskov, Sofia (BG)

(73) Assignee: NUVOLO TECHNOLOGIES CORPORATION, Davidson, NC (US)

( * ) Notice: Subject to any disclaimer, the term of this patent is extended or adjusted under 35 U.S.C. 154(b) by 201 days.

(21) Appl. No.: 18/138,773

(22) Filed: Apr. 25, 2023

(65) Prior Publication Data

US 2024/0143805 A1 May 2, 2024

Related U.S. Application Data

(60) Provisional application No. 63/419,473, filed on Oct. 26, 2022.

(51) Int. Cl.
*G06F 21/62* (2013.01)
*G06F 21/32* (2013.01)
*G06F 21/33* (2013.01)

(52) U.S. Cl.
CPC .......... *G06F 21/6209* (2013.01); *G06F 21/32* (2013.01); *G06F 21/335* (2013.01)

(58) Field of Classification Search
CPC ..... G06F 21/6209; G06F 21/32; G06F 21/335
See application file for complete search history.

(56) References Cited

U.S. PATENT DOCUMENTS

| | | | |
|---|---|---|---|
| 2018/0260617 A1* | 9/2018 | Jones | G06K 7/1417 |
| 2019/0325131 A1* | 10/2019 | Prayaga | G06F 9/44526 |
| 2020/0380090 A1* | 12/2020 | Marion | G06F 21/602 |
| 2021/0383003 A1* | 12/2021 | Katsoulakos | G06F 21/602 |
| 2022/0027486 A1* | 1/2022 | Drey | G06F 16/168 |
| 2022/0058242 A1* | 2/2022 | Drey | G06F 21/6209 |

\* cited by examiner

*Primary Examiner* — Sangseok Park
(74) *Attorney, Agent, or Firm* — Womble Bond Dickinson (US) LLP

(57) ABSTRACT

Methods, systems, and computer-readable storage media for secure document sharing. The method includes receiving, from a server system, metadata associated with a document stored by the server system. The document includes protected data. A user input including a request to access the document stored by the server system is received. The user input is processed to validate the request. A display of the document in a read only mode is generated. A user attempt to duplicate of at least one portion of the document presented for display is detected. A duplication identifier is added to the at least one portion of the document. The duplication identifier is indicative of a duplication source of the document presented for display.

11 Claims, 5 Drawing Sheets

DOCUMENT PROTECTION MECHANISM

CROSS-REFERENCE TO RELATED APPLICATIONS

The present application claims priority to U.S. Provisional Patent Appl. No. 63/419,473, filed Oct. 26, 2022, and incorporates its disclosure herein by reference in its entirety.

TECHNICAL FIELD

The subject matter described herein relates generally to methods and systems to protect shared documents and more specifically methods and systems to protect shared documents based on a duplication protection mechanism.

BACKGROUND

Electronic document sharing between multiple parties is an essential part of services that can be provided to multiple clients. A portion of the shared data can include information designed for restricted access. If the data designed for restricted access is shared as an editable document, the data can be easily replicated and further shared with other parties, including unintended parties that might not have been cleared to access the data. The replication practices can involve a significant risk for the data providers. There is accordingly a need for a computer-implementable document protection mechanism to enable secure and computational efficient distribution of electronic information products.

SUMMARY

Implementations of the present disclosure include computer-implemented methods for secure document sharing using a document protection mechanism. In some implementations, actions include receiving, from a server system, metadata associated with a document stored by the server system. The document includes protected data. A user input including a request to access the document stored by the server system is received. The user input is processed to validate the request. A display of the document in a read only mode is generated. A user attempt to duplicate at least one portion of the document presented for display is detected. A duplication identifier is added to the at least one portion of the document. The duplication identifier is indicative of a duplication source of the document presented for display.

Other implementations of this aspect include corresponding systems, apparatus, and computer programs, configured to perform the actions of the methods, encoded on computer storage devices.

These and other implementations can each optionally include one or more of the following features: the method can include generating an alert related to the user attempt to generate the duplicate of at least one portion of the document presented for display. The user input can include a token associated to the document and processing, by the one or more processors, the user input can include validating the token. The user input can include a user identifier and processing, by the one or more processors, the user input can include performing an authentication using the user identifier. The duplication identifier can include a water mark indicative of an illegitimate duplication, the water mark can include the user identifier and a timestamp indicative of a time of the illegitimate duplication. The metadata can be received at a set frequency. The document can be stored in a database of a cloud computing platform. The database can be configured to store a plurality of documents, a portion of the plurality of documents being accessible for editing or reading based on a user role. The method can include removing at least a portion of the document comprising the protected data from an output of a duplication operation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to secure document sharing using a document protection mechanism. More particularly, implementations of the present disclosure are directed to a secure mechanism to share a private document with clients (customers), while preventing them to copy or distribute any portion of the private document. The clients can automatically receive information about the protected data, which can be accessed in a read-only mode. A user interface of the application that enables reading of protected data can disable a set of application functions associated to document duplication. The application that enables data reading can be configured to detect a duplication attempt that can be initiated using the application used for document reading or additional applications, which can be tracked using a duplication identifier. The duplication attempt can trigger a duplication alert including a warning message.

Some advantages of the document protection mechanism include the ability to efficiently control the distribution of electronic information products. As another advantage, the described document protection mechanism can be implemented using an application that enables access to both protected and unprotected data in a computationally efficient manner. For example, images that are part of the protected content can be embedded in the document with unique, different, and temporary URLs each time the document is requested. Such customized control over data duplication can improve document sharing experience and efficiency of distinguishing between secure documents and unsecure documents that can be accessed in a secure way. As another example, the server can be setup to transmit, over the network to the user device, only a part of the document that is displayed on the user screen to help limiting the risk of network attacks, compromised user device or malicious user actions. In some implementations, the system allows users of protected documents to use the documents, link the documents and/or refer to the documents in their own computing system as if they were document authors, only limiting the export, the distribution and/or copy of the document's content. The described implementations can detect unusual behavior from users and prevent protected data extraction or duplication (e.g., using tools that can copy the content of the document, or detect high amount of requests to protected document in near real-time).

Figure 1:
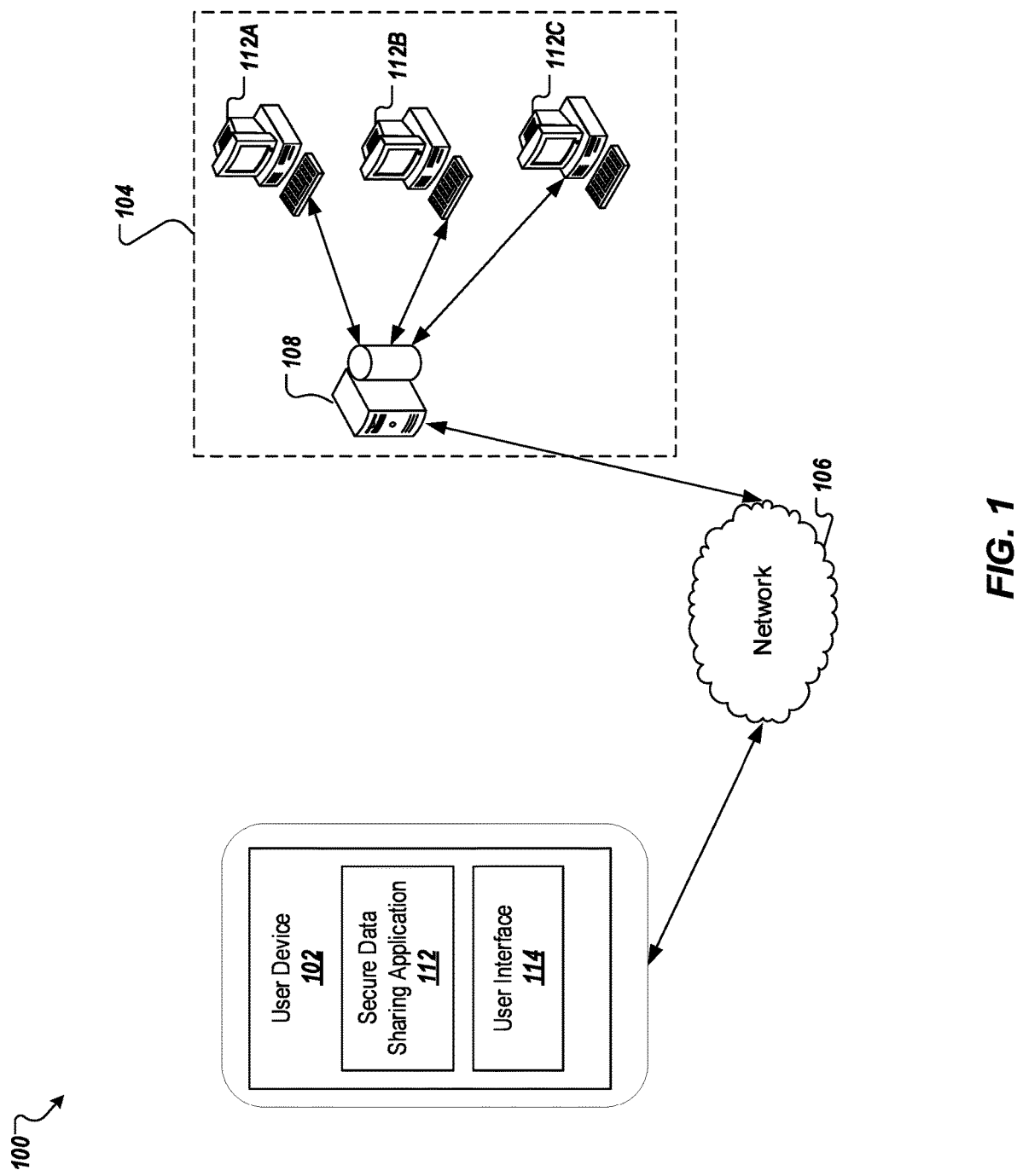
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more user devices 102, a server system 104 and a network 106. The server system 104 includes a server device 108 and one or more administrator devices 112A, 112B, 112C. In an example context, the user devices 102 and the one or more administrator devices 112A, 112B, 112C can include an application that is hosted by the server device 108 of the server system 104.

In some examples, the user device 102 and the one or more administrator devices 112A, 112B, 112C can communicate with the server device 108 of the server system 104 over the network 106. Even though a single user device 102 is depicted in the example architecture 100, it can be envisioned that the example architecture 100 can include multiple user devices 102. The user device 102 and the one or more administrator devices 112A, 112B, 112C can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server device 108 includes at least one server and at least one data store. In the example of FIG. 1, the server devices 108 are intended to represent various forms of servers including, but not limited to a cloud computing platform, such as cloud-based server, a web server, an application server, a proxy server, a network server, and/or a server pool. In general, server systems accept requests for application services and provides such services to any number of client devices (e.g., the user device 102) over the network 106. The data store of the server device 108 can be configured to store user identifiers (credentials) and user access levels, which can be modified by users of the administrator devices 112A, 112B, 112C authenticated using administrator credentials. The data store of the server device 108 can be configured to store secure documents that can be shared with the one or more user devices 102. The data store of the server device 108 can use a secure document sharing mechanism that prevents users accessing the user devices 102 as clients (e.g., customers) from copying or distributing any portion of secure document including private data.

In accordance with implementations of the present disclosure, multiple entities can access the secure document sharing application 112 through the user interface 114 of the one or more user devices 102 as authors (in author mode or testing mode) and clients. The secure document sharing application 112 can enable users to create and/or securely access documents stored by the server system 104. The documents can include textual data including intellectual property (private and confidential) data. In the depicted example, the user device 102 includes a secure document sharing application 112 configured to process input data (e.g., user input and secure documents) and a user interface 114 that enables receipt of user input and document display. The secure document sharing application 112 can interact with an application that is hosted by the server system 104 to retrieve or receive secure documents (e.g., including confidential images and text data) from the server device 108. The secure document sharing application 112 can be configured to run in an author mode (for users authenticated as authors), a test mode (for users authenticated as authors using applications running in a testing mode), or a client mode (for users authenticated as clients).

The secure document sharing application 112, in an author mode, can enable creation of new secure documents or receipt (import) of secure documents, which can be transmitted to server system 104 for storage and secured sharing. The secure document sharing application 112 can receive, in an author mode, a testing or a client mode, from the server system 104, information about the secure documents, such as metadata (e.g., data associated with a document such as document name) and can generate using the user interface 114, a display of a list of the available secure documents. The documents included in the displayed list can be selected, by a user input entered through the user interface 114, to be accessed. The access request can be transmitted by the user device 102 to the server system 104. The server system 104 can transmit to the user device 102 the requested secure documents. The user interface 114 can display the requested secure documents in a reading mode for a user with a client access level or can be displayed in an editable mode by a user with an author access level.

When the user is requesting a secured document in read-only mode, the system server 104 can transmit only part of the document that can be shown on the screen of the user device 102. If the user tries to read part of the document that is outside of the screen, the user device 102 requests the next part of the document, so it can display it on the screen. If the system server 104 detects high number of requests in small period of time (e.g., 50 requests in a second) by the same device, the server will assume that the user device is running malicious program that tries to export the protected data and will stop processing requests from that device temporarily (e.g. 1 day) or permanently. The secure document sharing application 112 can process a user input, entered through the user interface 114, to identify duplication attempts, which can be allowed or prevented depending on a user access level (duplication being prevented for clients and authors in testing mode, while duplication can be allowed for authors accessing the authored secure documents).

In accordance with implementations of the present disclosure, the server system 104 can host a secure document sharing service (e.g., provided as one or more computer-executable programs executed by one or more computing devices). For example, input data can be provided to the server system (e.g., from the user device 102), and the server system can process the input data through the secure document sharing service to provide result data (secure documents). For example, the server system 104 can send the result data (secure documents) to the user device 102 over the network 106 for display in a read only mode to enable secure document sharing.

Figure 2:
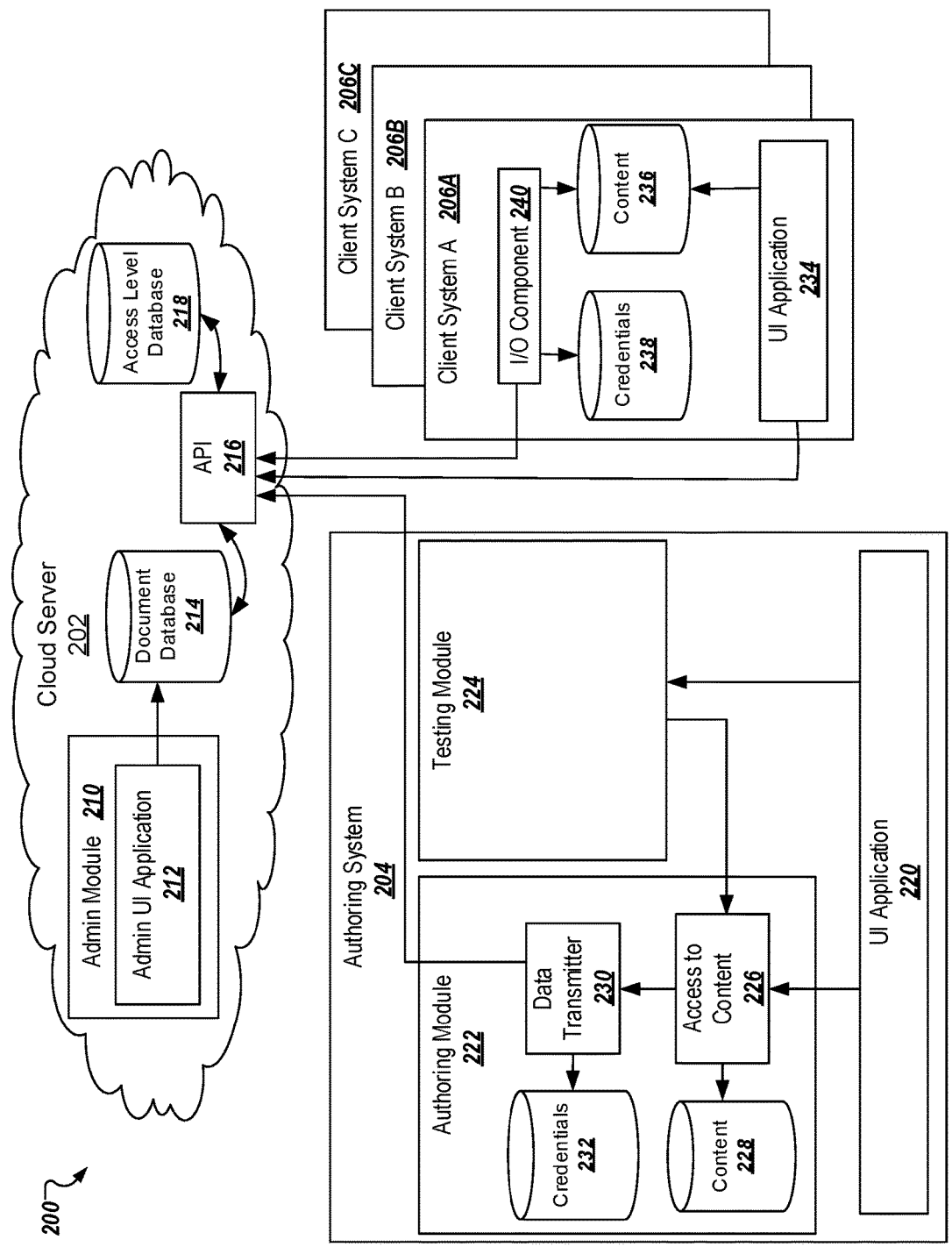
FIG. 2 depicts an example conceptual architecture in accordance with implementations of the present disclosure.

FIG. 2 illustrates an example conceptual architecture 200. In the depicted example, the example conceptual architecture 200 includes a cloud computing platform 202, such as a cloud server system, one or more authoring systems 204, and client systems 206A, 206B, 206C. The cloud computing platform 202 includes an administrator module 210 configured to execute an administrator application 212, a secure document database 214, an execution engine application programming interface (API) 216, and an access level database 218. The secure document database 214 can store secure documents including confidential (image and text) information, such as intellectual property content. The access level database 218 can store user information, user access level, and a mapping between user information and user access level relative to particular secure documents and/or document types.

Access to the secure document database 214 and the access level database 218, including database modifications regarding users who can create and who can access particular secure document content, can be provided through the administrator application 212, which is accessible only by a user authenticated as a system administrator. The administrator application 212 may provide an output for the secure document database 214 and the access level database 218 to add or remove users and/or update (add, remove, or modify) access level type for particular users for particular documents. When a user of the authoring system 204 or client system 206A, 206B, 206C requests access to secure documents stored by the secure document database 214, administrator module 210 performs operations to verify the access level of the user using the information stored in the access level database 218. The administrator module 210 can send some of the operations (or commands in support of an operation, such as a read, write, and/or the like) to the API 216 for execution of the secure document sharing mechanism.

The authoring systems 204 can include a computing system (e.g., user device 102 described with reference to FIG. 1) configured to execute operations related to secure documents. The operations can be executed in response to a user input, received from a user authenticated as an author of a secure document. The user input can be received using a user interface (UI) application 220. The authoring systems 204 can include an authoring module 222 and a testing module 224. In some implementations, the UI application 220 can be configured to enable a selection between the authoring module 222 and the testing module 224. The authoring module 222 can include an access module 226, a content database 228, a document transmitter 230, and a credential database 232. The access module 226 can receive a request from the UI application to access secure documents (e.g., to create or test secure documents). The request can be processed based on a login mode (as author or tester) to access the content stored in the content database 228. For example, the access module 226 can receive a request from the UI application to create new secure documents by an author with registered credentials. After the secure document is created and stored in the content database 228, the testing module 224 can perform operations, in a testing mode, enabling the author to access the secure document stored in the content database 228 in a testing (read only) mode. After the secure document and testing are completed, the document transmitter 230 can transmit newly added content stored in the content database 228 and associated credentials (retrieved from credential database 232) to the API 216 of the cloud computing platform 202. The authoring module 222 can be configured to enable secure document content authors (identified based on user credentials extracted from credential database 232) to edit previously stored secure documents.

The client systems 206A, 206B, 206C can include a client UI application 234, a content database 236, a credential database 238, and an in/out component 240. The content database 236 can be configured to store metadata received from the cloud computing platform 202 related to available secure documents that can be read by the client system 206A, 206B, 206C. The credential database 238 can store user credentials to enable secure access to requested documents. The in/out component 240 can be configured to receive metadata from the cloud computing platform 202 related to available secure documents that can be read by the client system 206A, 206B at a set frequency (e.g., sending information about available documents in a clustered way according to a schedule). The in/out component 240 can be configured to use of the in/out techniques that automatically enable document loss prevention (DLP), where trusted processes (e.g., document reading) are monitored and untrusted processes (e.g., that can be associated with duplication attempts) automatically trigger prevention techniques. Secured document may be received for a reading mode, by the client system 206A, 206B, 206C, using the in/out component 240. The in/out component 240 is also configured for document transmission (e.g., requests to access secure document and potentially unauthorized transmission of copies of the secure documents). The in/out component 240 can be configured to prevent user actions that explicitly or implicitly copy secure documents (e.g., adding copy duplication markers to the secure content, removing secure document content before transmission, deactivating a transmission function of the client system 206A, 206B, 206C or other duplication prevention measures that can be compatible with the described secure document sharing mechanism). The in/out component 240 can be configured to assist in preventing document leakage or other inappropriate release of secure document from the client system 206A, 206B, 206C, as a result of an automatic prevention operation executed by the in/out component 240. The in/out component 240 can be configured to ensure that the client system 206A, 206B, 206C complies with any policy requirements for secured document established by the cloud computing platform 202. In this manner, the techniques may prevent the unwanted release of secure document (e.g., though a DLP scan when an object is attempted to be duplicated when displayed in a reading mode).

Implementations of the present disclosure are described in detail herein with reference to an example context. The example context includes multiple entities (e.g., companies A, B, C and D) that communicate with each other according to the example conceptual architecture 200 to use a secure document sharing mechanism. A part of the entities (e.g., companies A and B) can be configured as authors for documents that can be uploaded to the cloud computing platform 202 and stored by the secure document database 214. The documents can include textual data including intellectual property (confidential) data. An entity that is an author (e.g., company A) can also be a client and can access documents created by another author (e.g., company B). Some entities (e.g., company C) can be a client that can access documents created by the authors (e.g., any or both companies A and B). Other entities (e.g., company D) might not have access to the shared documents generated by the authors and stored by the secure document database 214. Entities that are not registered as clients in the access level database 218 do not have access to any documents generated by either author (e.g., company A nor company B). All entities can create private documents for personal use, but only entities with author rights registered by the access level database 218 (e.g., companies A and B) can upload documents to the cloud computing platform 202 to be stored by the protected data database 214. A system administrator using the administrator module 210 can access the access level database 218 to add and/or remove entities (companies and users), and can configure the access level of each entity. In some implementations, author entities (e.g., companies A and B) do not know what entities have access to their documents. In some implementations, client entities (e.g., companies A and C) do not know the author entity of the secure documents they are accessing. When using the secure document sharing application 220, 234, all entities (e.g., companies and users) can read and modify their own documents, and depending on access level, document reading can be enabled (e.g., company A can read documents, shared by company B; company C can read documents, shared by companies A and B).

Figure 3A:
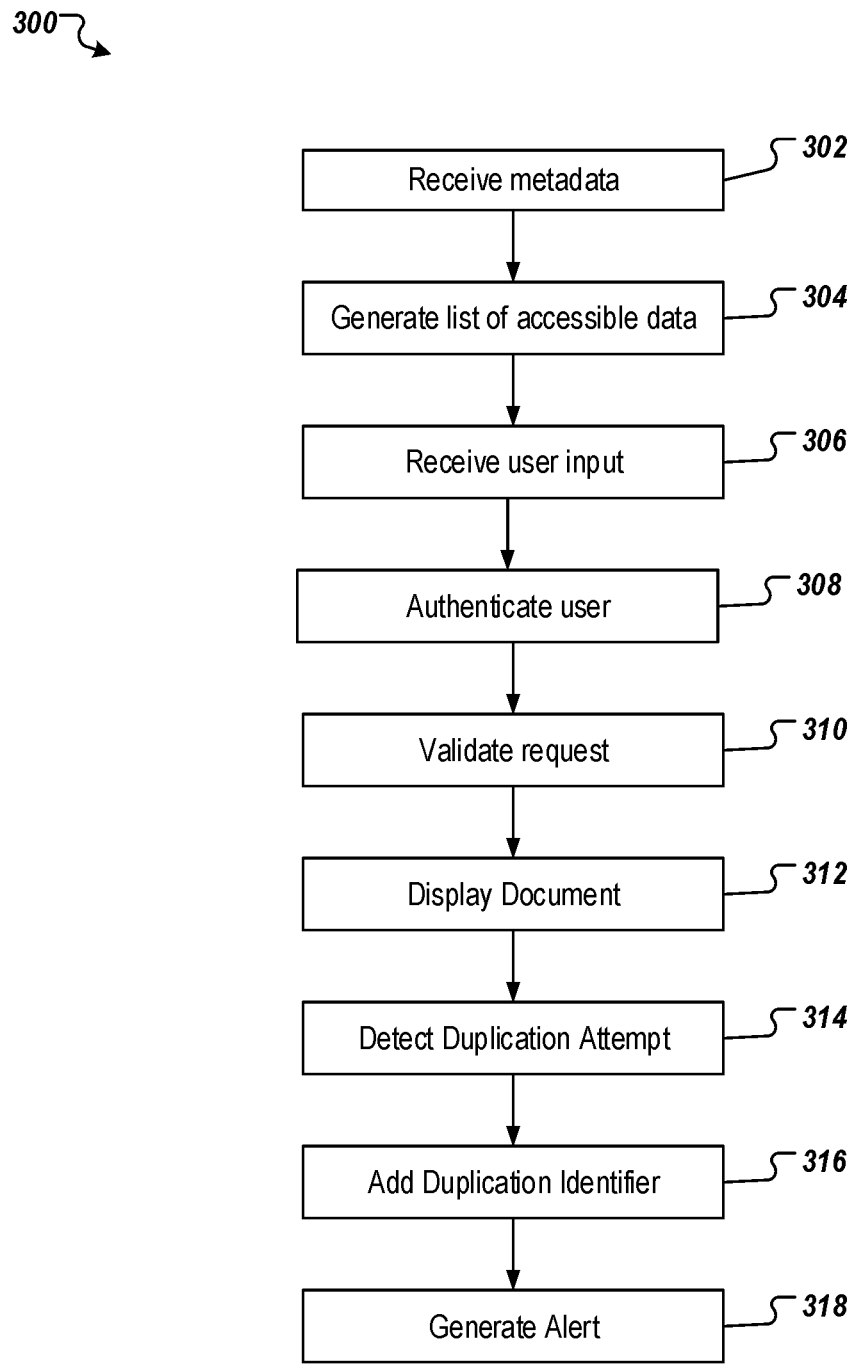
FIGS. 3A and 3B depict example processes that can be executed in accordance with implementations of the present disclosure.

FIG. 3A depicts an example process 300 that can be executed in accordance with implementations of the present disclosure. The example process 300 can include one or more computer-executable programs executed using one or more computing devices. In some implementations, the example process 300 can be executed by a user device (e.g., user device 102 described with reference to FIG. 1) and/or a client system (e.g., client system 206A, 206B, 206C described with reference to FIG. 2).

At 302, metadata associated with one or more documents (including a secure document) is received from a data synchronization tool (e.g., API 216 described with reference to FIG. 2) configured to transmit data from a database of a server system (e.g., server system 104 described with reference to FIG. 1 or cloud computing platform 202 described with reference to FIG. 2). The database can be configured to store multiple documents, a portion of the documents being accessible for editing and another portion of the documents being accessible only for reading, based on a user access level. The metadata can be received according to a schedule (e.g., client subscription schedule) defining a set frequency (e.g., daily, weekly or monthly frequency) of metadata receipt relative to availability of a particular type of newly created (secure) documents associated with a client. The metadata can include data associated with selected available documents associated with the user (based on a user identifier document type mapping), rather than all documents stored in a database of the server system. The metadata can include data associated with a (secure) document, such as document name, a document identifier, a document storage location identifier, a document topic or any other data describing the document. At least a portion of the secure document can include protected data (e.g., privileged and confidential intellectual property content that should not be duplicated and/or distributed). The secure document can be generated by an author having editing rights. The secure document can be stored by the server system.

At 304, a list of accessible data is generated based on the metadata. The list of accessible data can include the titles of documents (including secure documents) that can be accessed by a user of a client device or an author of the secure documents, accessing the user device in a testing mode. In some implementations, the titles of the documents can be grouped based on one or more criteria including an access level and/or a document topic. The list of accessible data is exclusively generated based on the received metadata, such that clients only have access to the data that is shared with them (based on the sent metadata).

At 306, a user input, entered using a user interface (e.g., user interface 114 described with reference to FIG. 1), is received. The user input can include a user credentials (e.g., user identifier and password) and a user request for a secure document. The user request for the secure document can include a token associated to the document. The token can indicate a selection of a secure document to be displayed in reading mode. For example, user request can request the secure document to be displayed by the user interface of the UI application (e.g., UI application 220, 234 described with reference to FIG. 2) in a read-only state.

At 308, the user is authenticated by processing the user credentials and, optionally, one or more biometric data. The authentication includes an identification of whether the user is a registered client with reading or editing rights.

At 310, the user request for the secure document is validated. The validation includes token processing for identification of whether the user access level for the requested secure document includes reading or editing rights.

At 312, in response to determining that the user has reading rights for the requested secure document, the requested secure document is displayed, by the user interface, in a reading mode. In some implementations, the protected content of the secure document is loaded together with non-protected content (e.g., content created by the client or an entity including the client). The requested secure document can be displayed using unique and temporary uniform resource locators for images and one or more security measures implemented in the UI application to minimize a secure document duplication risk. The protected content can be displayed, in a reading mode, with visual indicator indicating that the content is protected. For example, the visual indicator can include a copyright text. The protected content can be displayed, in a reading mode, in a manner that enables reading of the secure document, while one or more application features (e.g., right click, printing, selection of a document portion or other copy related functions) can be deactivated.

At 314, a duplication attempt is detected. In some implementations, the UI application can be configured to generate an alert trigger in response to detecting an attempt to duplicate at least a portion of the protected content of the secure document. The attempt to duplicate at least a portion of the protected content of the secure document can include an attempt to use one or more deactivated application features (e.g., right click, printing, selection of a document portion or other copy related functions) or initiation of an additional application that enables duplication, such as a printing application, an image capture application or other applications that enable duplication of displayed data).

At 316, in response to generating the alert trigger, a duplication identifier is added to the duplicated content. The duplication identifier can include a marker, such as a watermark and time stamp. The watermark can include an invisible watermark with a pattern that can be hidden in the duplicated content that it is unperceivable to users but could be extracted, by one or more processors, based on a comparison of the original content to the duplicated content. The invisible watermark can be added to a variable location of the document that can be associated with a duplication information (e.g., a time or user identifier associated to the duplication). The invisible watermark can include a pattern that provides coded information associated to the duplication. The duplication identifier can enable identification of a duplication source (user identifier and duplication time) associated to the privacy breach, through the invisible watermark.

At 318, an alert is generated. The alert can include a transmission of the duplication attempt data to an administrator of the cloud computing platform to be displayed by an administrator UI application (e.g., administrator UI application 212 described with reference to FIG. 2). The duplication attempt data can include a secure document identifier, a protected content identifier, a duplication attempt time, the user identifier of the user attempting to duplicate the content, and a duplication identifier (matching data included in the watermark added to the duplicated content). The alert can include a display on the user interface of a warning message indicating that duplication of at least a portion of the protected content of the secure document is illegal. The warning can be included in a popup window that at least partly overlaps the portion of the protected content of the secure document selected for duplication. The alert can trigger a removal (deletion or obfuscation) of the portion of the protected content of the secure document from the display within the user interface (e.g., removal of the portion of the protected content from a duplication, such as printing, preview). In some implementations, a function of the user device can be automatically deactivated simultaneous with the alert generation to prevent a completion of the document duplication. The deactivated function of the user device can include a communication of the user device with an external device (e.g., printer or other user devices identified as ineligible to access the secure document).

Figure 3B:
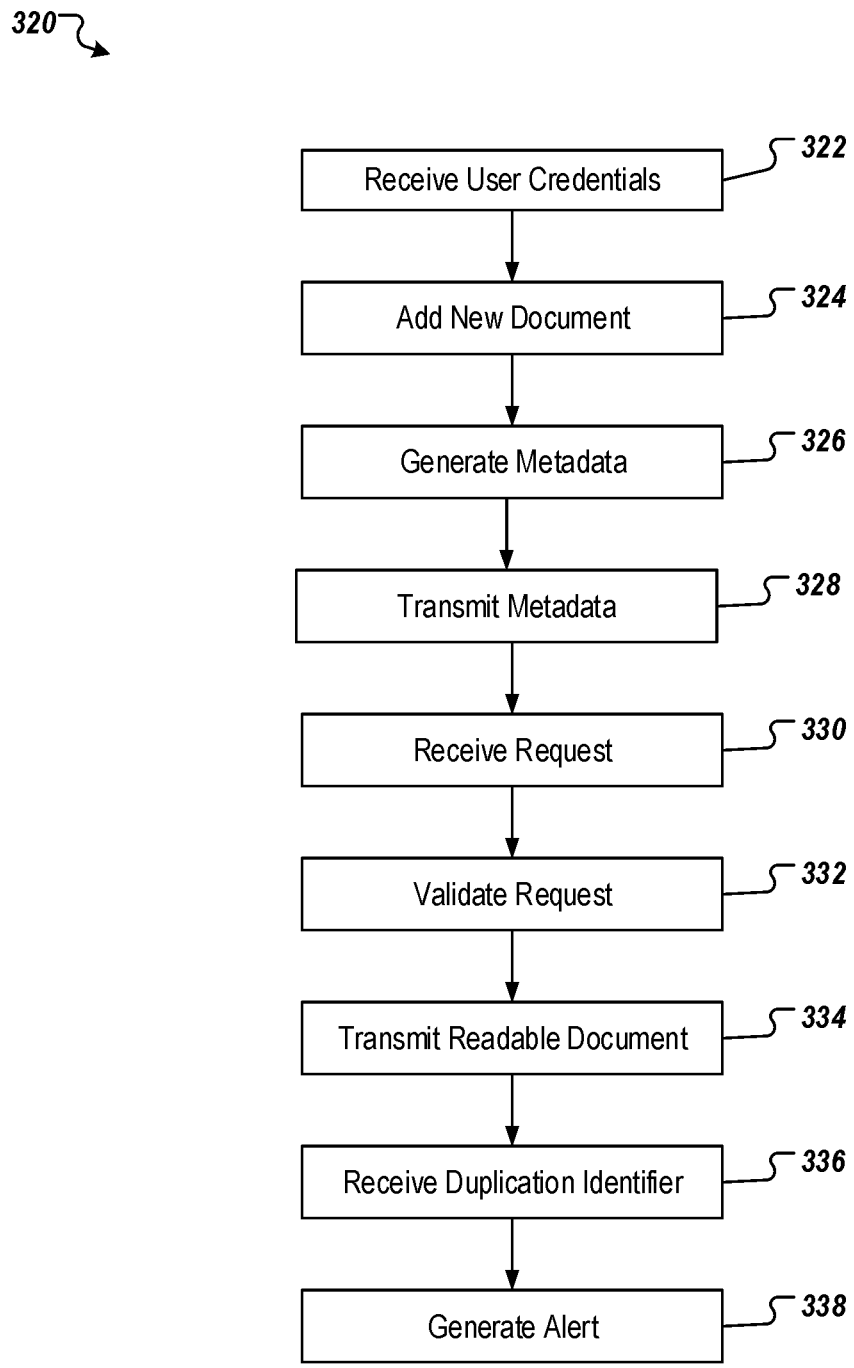

FIG. 3B depicts an example process 320 that can be executed in accordance with implementations of the present disclosure. The example process 320 can include one or more computer-executable programs executed using one or more computing devices. In some implementations, the example process 320 can be executed by a computing device of a server system (e.g., server system 104 described with reference to FIG. 1 or cloud computing platform 202 described with reference to FIG. 2).

At 322, user credentials are received from a user device (e.g., user device 102 described with reference to FIG. 1) and/or a client system (e.g., client system 206A, 206B, 206C described with reference to FIG. 2). The user credentials can include user identifiers (associated to one or more entities) and user security data (e.g., user password). Each user can have an access level associated to a document based on a user role relative to the document. For example, a user role can include any of an administrator, author, and client. In some implementations, a user identifier can be associated to an author role for a first document and with a client role for a second document. An administrator role can be independent of documents but can be associated to document types. The user credentials can be stored in an access level database (e.g., access level database 218 described with reference to FIG. 2).

At 324, a new document is added, by a user identified as an author, to a database (e.g., secure document database 214 described with reference to FIG. 2) of the server system (e.g., server system 104 described with reference to FIG. 1 or cloud computing platform 202 described with reference to FIG. 2). The database can be configured to store multiple types of documents, a portion of the documents being accessible for editing and another portion of the documents being accessible only for reading, based on a user access level. In some implementations, the newly stored document is not shared to other user devices until the author of the document indicates that the stored document is complete, tested, and ready to be shared. The new document can include a secure document. At least a portion of the secure document can include protected data (e.g., privileged and confidential intellectual property content that should not be duplicated and/or distributed). The secure document can be generated by an author having editing rights. The secure document can be stored by the server system.

At 326 metadata for the new document is generated. Metadata can be automatically generated each time a new document is added to the database or upon receipt of indication that the stored document is complete, tested, and ready to be shared. The metadata can include data associated with selected available documents associated with the user (based on a user identifier document type mapping), rather than all documents stored in a database of the server system. The metadata can include data associated with a (secure) document, such as document name, a document identifier, a document storage location identifier, a document topic or any other data describing the document.

At 328 metadata is transmitted to a user device (e.g., user device 102 described with reference to FIG. 1) and/or a client system (e.g., client system 206A, 206B, 206C described with reference to FIG. 2). The metadata can be transmitted by a data synchronization tool (e.g., API 216 described with reference to FIG. 2) of the server system. The metadata can be transmitted according to a schedule (e.g., client subscription schedule) defined by an administrator. The metadata transmission schedule can include a frequency defining the number of times the metadata of a particular type of newly created (secure) documents should be automatically transmitted within a set period of time (day, week or month) to respective user devices.

At 330, a request to access a document stored by the database (e.g., secure document database 214 described with reference to FIG. 2) of the server system (e.g., server system 104 described with reference to FIG. 1 or cloud computing platform 202 described with reference to FIG. 2) is received from a user device. The request can include user credentials (e.g., user identifier and password) and a request to access a secure document. The user request for the secure document can include a token associated to the document. The token can be automatically generated by the user devices in response to a selection of a secure document from the list derived from the metadata of available documents. For example, the user request can request the secure document to be displayed by the user interface of the UI application (e.g., UI application 220, 234 described with reference to FIG. 2) in a read-only state.

At 332, the user is authenticated and the user request for the secure document is validated. The user is authenticated by processing the user credentials and, optionally, one or more biometric data. The authentication includes an identification of whether the user is a registered client with user information stored in the access level database (e.g., the access level database 218 described with reference to FIG. 2) with reading or editing rights. The validation includes token processing for identification of whether the user access level for the requested secure document includes reading or editing rights.

At 334, in response to determining that the user has reading rights for the requested secure document, unique and temporary uniform resource locators is transmitted to the user device to enable the requested secure document to be displayed, by the user interface, in a reading mode. The transmission of uniform resource locators for requested secure document provides security measures that minimize a secure document duplication risk.

At 336, a duplication identifier of a duplication attempt is received from the user device. In some implementations, the received duplication identifier matches a duplication identifier added to the duplicated content. The duplication identifier can include a marker metadata describing features of a duplication marker, such as a watermark and time stamp. The watermark can include an invisible watermark with a pattern that can be hidden in the duplicated content that it is unperceivable to users but could be extracted, by one or more processors, based on a comparison of the original content to the duplicated content. The invisible watermark can be added to a variable location of the document that can be associated with a duplication information (e.g., a time or user identifier associated to the duplication). The invisible watermark can include a pattern that provides coded information associated to the duplication. The duplication identifier can enable identification of a duplication source (user identifier and duplication time) associated to the privacy breach, through the invisible watermark.

At 338, an alert is generated. The alert can include a transmission of the duplication attempt data to an administrator of the cloud computing platform to be displayed by an administrator UI application (e.g., administrator UI application 212 described with reference to FIG. 2). The duplication attempt data can include a secure document identifier, a protected content identifier, a duplication attempt time, the user identifier of the user attempting to duplicate the content, and a duplication identifier (matching data included in the watermark added to the duplicated content). The alert can include a display on an administrator user interface of a warning message indicating an attempt to duplicate at least a portion of the protected content of the secure document. The alert can trigger a removal (deletion or temporary suspension) of access rights to the protected content of the secure document (e.g., buy modifying an access level of the user attempting the duplication). The access right removal can include a modification of user information stored in the access level database (e.g., the access level database 218 described with reference to FIG. 2), which affects at least reading rights for the user device.

The example processes 300 and 320 enable secure sharing of secure documents including intellectual property data in read-only manner that prevents duplication of protected content and distribution of protected content to unauthorized entities (parties). The described process does not impact users reading shared and protected content, in comparison to reading regular documents that do not include secure content. The described process enables reading of protected data on a user device having a client role, while the user device only stores metadata (non-sensitive data). The user device is not enabled to update documents that include secure content, and if an attempt to update secure content is detected at the user device, a user-friendly message can be displayed.

Figure 4:
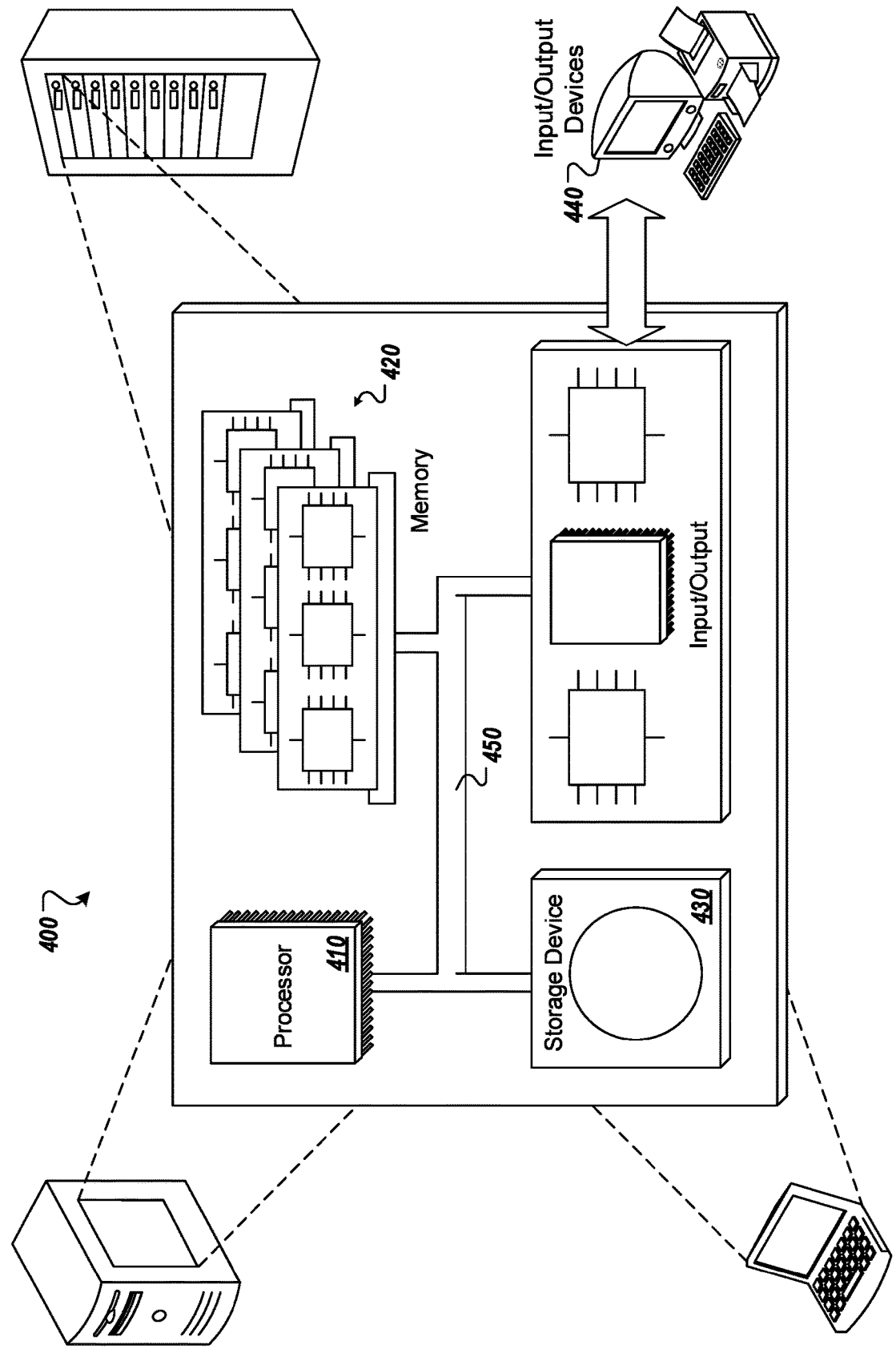
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
receiving, by one or more processors from a server system, metadata associated with a document stored by the server system, the document comprising protected data;
receiving, by the one or more processors, a user input comprising a request to access the document stored by the server system and the user input including a user identifier and a token associated to the document;
processing, by the one or more processors, the user input to validate the request and the token;
performing an authentication using the user identifier;
generating, by the one or more processors, a display of the document in a read only mode;
detecting, by the one or more processors, a user attempt to generate a duplicate of at least one portion of the document presented for display; and
adding, by the one or more processors, a duplication identifier to the at least one portion of the document indicative of a duplication source of the document presented for display, wherein the duplication identifier comprises a water mark indicative of an illegitimate duplication, the water mark comprising the user identifier and a timestamp indicative of a time of the illegitimate duplication.

2. The computer-implemented method of claim 1, further comprising:
generating an alert related to the user attempt to generate the duplicate of at least one portion of the document presented for display.

3. The computer-implemented method of claim 1, wherein the metadata is received at a set frequency.

4. The computer-implemented method of claim 1, wherein the document is stored in a database of a cloud computing platform, the database being configured to store a plurality of documents, a portion of the plurality of documents being accessible for editing or reading based on a user role.

5. The computer-implemented method of claim 1, further comprising:
removing at least a portion of the document comprising the protected data from an output of a duplication operation.

6. A non-transitory computer-readable storage medium comprising a program for execution by a processor of a device, the program including instructions which, when executed by the processor, cause the device to perform operations comprising:
receiving, by one or more processors from a server system, metadata associated with a document stored by the server system, the document comprising protected data;
receiving, by the one or more processors, a user input comprising a request to access the document stored by the server system and the user input including a user identifier and a token associated to the document;
processing, by the one or more processors, the user input to validate the request and the token;
performing an authentication using the user identifier;
generating, by the one or more processors, a display of the document in a read only mode;
detecting, by the one or more processors, a user attempt to generate a duplicate of at least one portion of the document presented for display; and
adding, by the one or more processors, a duplication identifier to the at least one portion of the document indicative of a duplication source of the document presented for display, wherein the duplication identifier comprises a water mark indicative of an illegitimate duplication, the water mark comprising the user identifier and a timestamp indicative of a time of the illegitimate duplication.

7. The non-transitory computer-readable storage medium of claim 6, the operations further comprising:
generating an alert related to the user attempt to generate the duplicate of at least one portion of the document presented for display.

8. The non-transitory computer-readable storage medium of claim 6, wherein the metadata is received at a set frequency and wherein the document is stored in a database of a cloud computing platform, the database being configured to store a plurality of documents, a portion of the plurality of documents being accessible for editing or reading based on a user role.

9. The non-transitory computer-readable storage medium of claim 6, the operations further comprising:
   removing at least a portion of the document comprising the protected data from an output of a duplication operation.

10. A system comprising: a processor; and
   a computer-readable storage medium coupled with the processor, wherein the computer-readable storage medium comprising a program for execution by the processor, the program including instructions which, when executed by the processor, cause the processor to perform operations comprising:
      receiving, by one or more processors from a server system, metadata associated with a document stored by the server system, the document comprising protected data;
      receiving, by the one or more processors, a user input comprising a request to access the document stored by the server system and the user input including a user identifier and a token associated to the document;
      processing, by the one or more processors, the user input to validate the request and the token;
      performing an authentication using the user identifier;
      generating, by the one or more processors, a display of the document in a read only mode;
      detecting, by the one or more processors, a user attempt to generate a duplicate of at least one portion of the document presented for display; and
      adding, by the one or more processors, a duplication identifier to the at least one portion of the document indicative of a duplication source of the document presented for display, wherein the duplication identifier comprises a water mark indicative of an illegitimate duplication, the water mark comprising the user identifier and a timestamp indicative of a time of the illegitimate duplication.

11. The system of claim 10, the operations further comprising:
   generating an alert related to the user attempt to generate the duplicate of at least one portion of the document presented for display.

* * * * *